A. T. WEAVER, E. W. D. LAUFER AND E. VON WINTZINGERODE.
METHOD OF AND APPARATUS FOR TREATING WASTE PICKLE LIQUOR.
APPLICATION FILED AUG. 3, 1916.
1,348,462.
Patented Aug. 3, 1920.
2 SHEETS—SHEET 2.
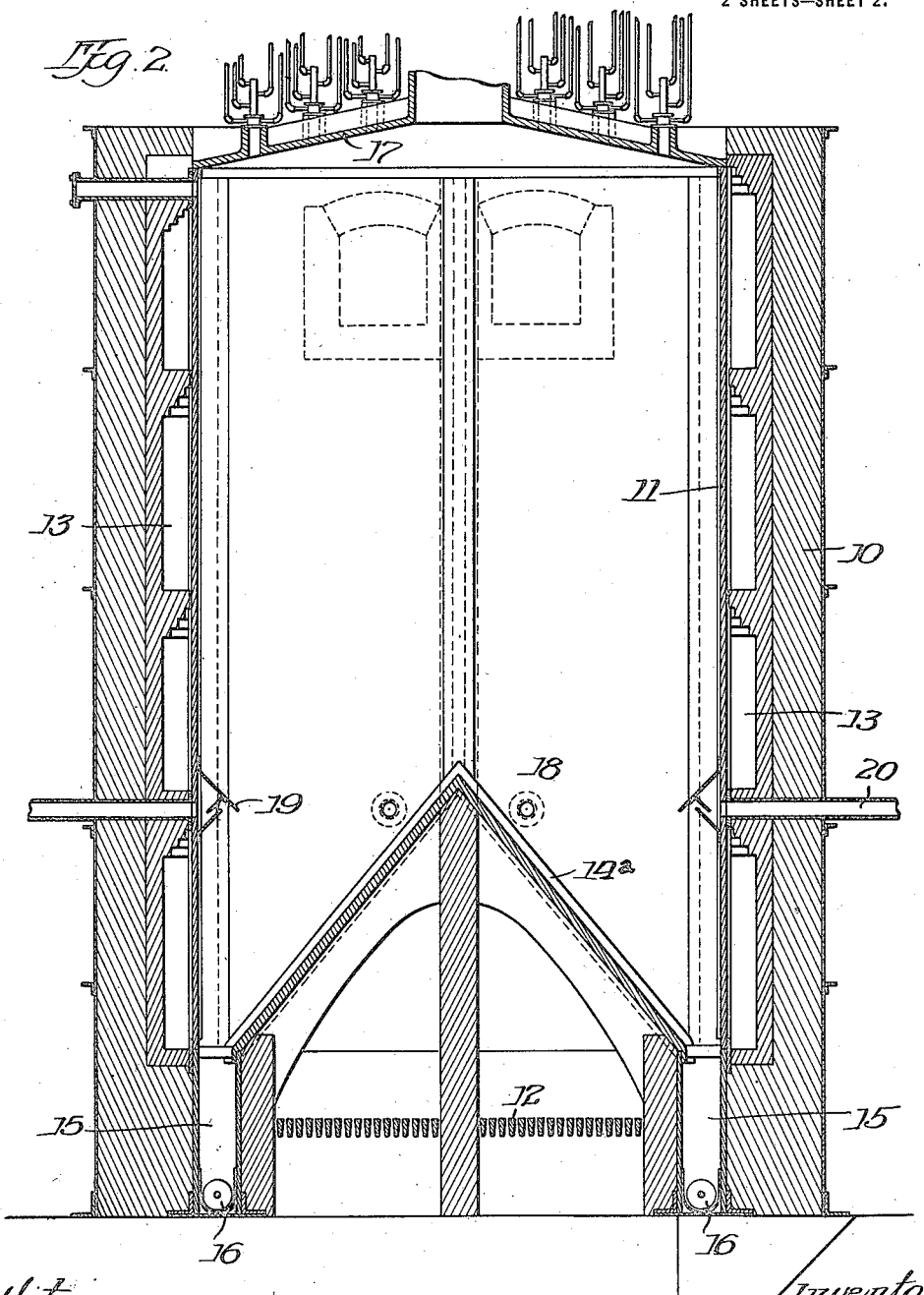

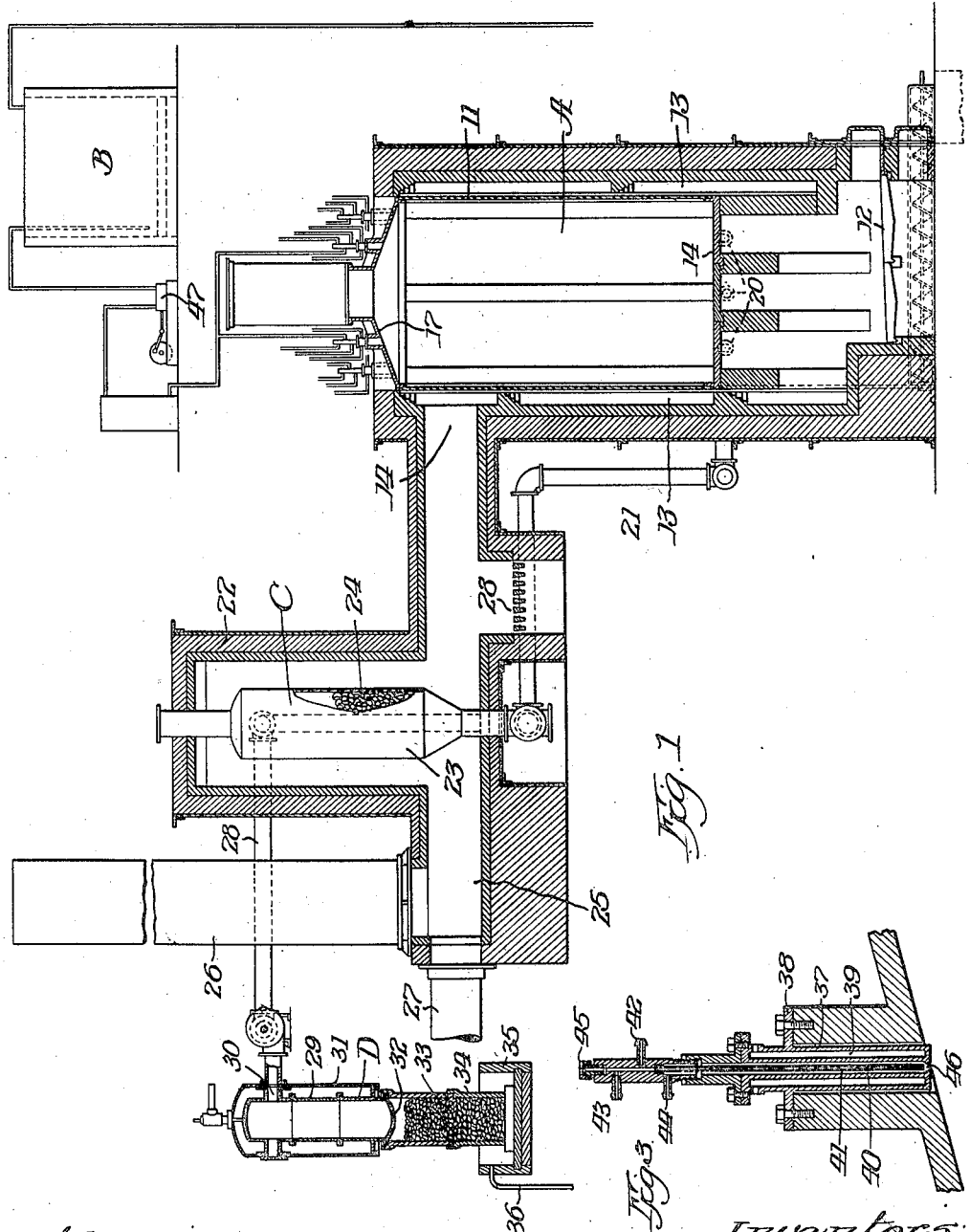

UNITED STATES PATENT OFFICE.

ALBERT T. WEAVER, OF JOLIET, ERNEST W. D. LAUFER, OF ARLINGTON HEIGHTS, AND EBERHARD von WINTZINGERODE, OF CHICAGO, ILLINOIS, ASSIGNORS TO THE AMERICAN STEEL & WIRE COMPANY OF NEW JERSEY, OF HOBOKEN, NEW JERSEY, A CORPORATION OF NEW JERSEY.

METHOD OF AND APPARATUS FOR TREATING WASTE PICKLE LIQUOR.

1,348,462.     Specification of Letters Patent.     Patented Aug. 3, 1920.

Application filed August 3, 1916. Serial No. 112,898.

*To all whom it may concern:*

Be it known that we, ALBERT T. WEAVER, a citizen of the United States, and resident of Joliet, in the county of Will and State of Illinois, ERNEST W. D. LAUFER, a citizen of the United States, and resident of Arlington Heights, in the county of Cook and State of Illinois, and EBERHARD von WINTZINGERODE, a subject of the Emperor of Germany, and resident of Chicago, in the county of Cook and State of Illinois, have invented certain new and useful Improvements in Methods of and Apparatus for Treating Waste Pickle Liquor, of which the following is a specification.

Our invention relates to a method of and apparatus for treating waste pickle liquor, and particularly to a method of and apparatus for recovering iron oxid and sulfuric acid from such liquor.

This application is a continuation of applications Serial No. 44,593, and Serial No. 44,594, filed August 9, 1915, in so far as the disclosure of the applications are identical. The earlier application disclosed an apparatus for carrying out the method of applicants, together with a description of the method. However, said application included a furnace or retort similar to the one herein disclosed and covered the full details thereof. This application includes the retort of the earlier application and the method therein disclosed.

In sheet, plate, wire mills and other establishments in which steel is produced in its different forms, it is customary to clean or pickle the articles either prior to or after being subjected to treatments, such as galvanizing, tinning, etc. This treatment consists in immersing the article in a bath of weak sulfuric acid. As a result, the bath becomes weakened, due to the formation of soluble sulfates therein, and the bath must be renewed at intervals. The problem in large mills is twofold: first, as to a method of disposing of this waste liquor. It is contrary to Government laws to discharge the liquor into flowing streams because of the presence of a sufficient quantity of free acid to contaminate water and act upon metal work in the streams; second, the problem is presented as to a means for saving the relatively large quantity of iron oxid and sulfuric acid. Some of the acid is free, but the larger portion thereof is combined in the form of sulfates.

We are aware that many methods have been proposed for treating the soluble sulfates analytically in order to separate the elements, but all the methods with which we are acquainted are subject to many objections.

One of the principal objects of the present method and apparatus is to provide a continuous process which may be carried out without interruption and which shall have ample capacity.

A further object is in the provision of means whereby the conversion operations may be carried out in a zone apart from the path of the products of combustion, to the end that the by-products may be free of foreign matter, such as free carbon, carbon monoxid, carbon dioxid, etc.

It is, we believe, fundamental that in order to separate a compound into its elements it is necessary to supply at least as great an amount of heat as was evolved in the synthetical reaction in which the compound was formed. Not only is this true, but in the present instance because of the fact that the compound is diluted with a large amount of water an additional amount of heat must be supplied, sufficient to vaporize the water in which the compound is found. We have, therefore, conceived the idea of providing a closed retort or chamber adapted to be highly heated and into which the pickle liquor containing ferrous sulfate in solution is sprayed. The spraying to which we refer is more in the nature of an atomization, it being necessary that the liquid shall be subdivided into practically its molecular relation, and to that end we have devised a spray nozzle by means of which the liquor is supplied to the chamber under air pressure in the form of a heavy vapor or mist.

The method and apparatus will be more readily understood by reference to the accompanying drawings, wherein—

Figure 1 is a vertical section through a plant constructed in accordance with our invention, the illustration being somewhat diagrammatic in form;

Fig. 2 is an enlarged vertical section through the conversion furnace, the view taken at right angles to that of Fig. 1 and Fig. 3 is an enlarged view of one of the nozzles employed.

The conversion furnace is mounted upon a suitable foundation and comprises brick walls 10 and a suitable metal lining 11. Grates 12 are placed in the lower portion of the furnace. Combustion takes place above the grate and the products of combustion pass upwardly through the space 13 to the outlet 14. An inverted V-shaped floor 14ª is provided in the furnace upon which iron oxid is deposited and from which the same falls into the spaces 15. At the bottom of the spaces we provide two conveyers 16, by means of which the oxid is removed, either continuously or at intervals.

The roof 17 of the furnace is likewise of metal and is provided with a plurality of apertures within which nozzles are mounted, such as shown in detail in Fig. 3 and which will be specifically described hereinafter.

At a point near the lower end of the furnace we provide a plurality of outlets 18, covered by suitable baffles 19, through which the vaporous products of the reaction escape. It has been found that all of the vapors may be allowed to pass out through apertures near the lower end of the furnace and all of such vapors caused to pass through the catalyzer. Conduits 20 connect the openings 18 to a main 21, by means of which the vapors are conveyed to the lower end of the catalyzer shell.

The catalyzer is contained within a chamber formed by the walls 22 and consists of a shell 23 containing a quantity of iron oxid, indicated at 24, preferably in the form of lumps or nodules. We may prefer to use platinized asbestos instead of the iron oxid. It will be understood that in this device the $SO_2$ is converted into $SO_3$. The chamber within which the shell is mounted is connected with the flue 14 from the furnace and the products of combustion are caused to pass around the catalyzer; thence out through the flue 25 to the stack 26, or to the conduit 27 which may lead to bakers or similar devices which require heat. We prefer also to provide an auxiliary grate 28, by means of which additional heat may be supplied to the catalyzer if necessary. The specific form of the catalyzer forms no part of our invention.

The vapors leave the catalyzer at the upper end and pass through the pipe 28 to the acid condenser D. This device is of simple construction and serves to combine the sulfur trioxid delivered from the catalyzer with the steam, and change the sulfurous acid to sulfuric acid. It consists of a cast iron lead-lined cylindrical shell 29 having an inlet 30 for the vapors. The cast iron shell is surrounded by a lighter shell 31 forming a jacket between the walls within which cold water is circulated. At the bottom of the chamber we provide a perforated lead plate 32, through which the condensed vapors, now in the form of acid, may trickle, falling upon a quantity of stone 33, held within a vitreous casing 34, the lower portion of which is seated in and sealed by a lead-lined tank 35. The acid may be removed through the outlet 36, or may be returned through the condenser by a suitable circulating pump, for the purpose of increasing the strength of the finished acid.

We have shown in the drawings and have described the use of a catalyzer through which the vapors pass in the passage thereof from the retort to the condenser. We do not rely on the use of the catalyzer for the carrying out of our invention. The use of a catalyzer is well known and in our method we use it merely for the purpose of hastening the oxidation of sulfurous gases to sulfuric. It is by no means essential that a catalyzer be used, and we do not wish to be understood as limiting our invention to such an apparatus wherein a catalyzer is an essential part and a method depending on the action of a catalyzer for its functioning.

The spray nozzles, such as shown in Fig. 3, comprise a tubular portion 37, adapted to be seated in the apertured lugs formed in the top of the furnace, and are provided with an annular flange 38, by means of which the nozzle is bolted to the flange of the lug. Walls are provided in the tubular portion 37, whereby the space is divided into a water container 39 and an air conduit 40. A small tube 41 is interposed in the air space, and the liquor is adapted to be supplied to this tube at the inlet 42. A connection 43 provides also for the entrance of air to the liquor conduit, and the entrance 44 provides for the supply of air to the space 40. The extreme upper end of the nozzle is closed by a stuffing box 45, which may be removed or loosened to permit the insertion of a pointed wire, this wire to be directed to the contracted exit opening 46, which may become clogged after continued operation. By the use of the nozzle described, we are enabled to spray the liquor into the furnace in practically its molecular relation, the mechanical sub-division being so fine as to give the appearance of a fog or mist.

The liquor to be treated is stored in the tank B and is removed therefrom by the pump 47 and delivered to the nozzle in the top of the furnace, air being supplied at suitable pressure as required.

The operation of the method is as follows: Assuming a supply of liquor in the tank B, the fires are started on the grates 12 of the furnace, and, when the furnace is sufficiently heated the nozzles at the upper portion of the furnace are turned on and the operation begins. It is intended that the temperature in the upper portion of the furnace shall be approximately 1200 F., and at the lower portion approximately 1500 F. Immediately upon the entrance of the liquor into the temperature described, it is vaporized, the water being changed into the form of steam, the acid fumes descending and becoming more highly heated as they descend. The analytical reaction then begins and the sulfate is broken up, forming sulfur dioxid and sulfur trioxid, the iron oxid being released. The sulfurous and sulfuric acid gases thus formed and the steam pass out through the openings 18 and are directed into the catalyzer, where the sulfur dioxid is transformed into sulfur trioxid, and the sulfurous acid to sulfuric, the temperature maintained in the catalyzer being between 800 and 1000 F.

The vapors after leaving the catalyzer are conducted to the condenser where the acid gases combine with the steam and are condensed to form sulfuric acid. The iron oxid which is deposited in the furnace has been found to be of an exceedingly high quality, this result being secured, undoubtedly, by the freedom from deleterious or contaminating substances which are ordinarily found in products of combustion. The reaction taking place in a closed chamber, the chemicals do not come in contact with any of the waste products of combustion. The resultant recovery of iron oxid is, therefore, of considerable value for pigments over that ordinarily produced, being naturally in an impalpable state of division without grinding. It will be seen that the process is continuous and that once having started the plant its operation becomes simple requiring but little attention other than that of maintaining the proper temperatures.

The process has, after a series of tests, been found to operate in the manner described and to produce sulfuric acid and iron oxid in a most efficient manner. While the steps described will be followed preferably as herein described, it is possible to vary such steps to a certain extent and to modify the apparatus to a still greater extent, all without departing from the spirit of our invention.

We claim:

1. In a method of treating a pickle liquor solution including certain sulfates in water and recovering sulfurous and sulfuric acid gases and oxids, the steps of spraying the solution in a finely divided condition into a furnace, conducting the evolved water and sulfurous and sulfuric acid gases from the furnace, condensing the vapors in the presence of steam and depositing the oxid on the floor of the furnace, substantially as described.

2. In apparatus for treating waste pickle liquor, the combination of a retort, means for heating the walls of said retort to an extent sufficient to cause a breaking up of or chemical reaction in the matter being treated, means for atomizing the liquid to be treated into the retort, a condenser, means for conducting the gases and vapors from the retort to said condenser, the lower portion of said retort being formed to receive the solid residue from the reaction, substantially as described.

3. In a method of treating waste pickle liquor, the steps of atomizing the liquor into a retort having a temperature of 1200 to 1500° F., whereby a chemical reaction takes place, depositing the evolved oxid on the floor of the retort, conducting the evolved sulfurous and sulfuric acid gases from the retort and condensing the same in the presence of water.

4. In an apparatus for treating waste pickle liquor, the combination of a retort, means for generating heat by a flame exteriorly thereof whereby a temperature of substantially 1200 degrees F. is maintained within said retort, means for spraying sulfate in solution into said retort, means for conveying away the volatile constituents of the liquor and permitting the deposition of the oxid on the floor of the retort, substantially as described.

5. In an apparatus for treating waste pickle liquor, the combination of a vertically disposed retort, means for highly heating the exterior of said retort, whereby the interior thereof is maintained at a temperature of approximately 1200 degrees F., the interior of the retort being normally closed to the atmosphere and to the products of combustion, means in the upper portion of the furnace for spraying the liquid to be treated, and means for conveying away the volatile constituents of the liquid, substantially as described.

6. The method of treating waste pickle liquor solution to recover the constituents thereof, which consists in subjecting said solution in atomized form to heat whereby the oxid is recovered in a solid state, withdrawing the evolved gases from said retort and condensing the same whereby any sulfurous acid may become sulfuric acid on exposure to the atmosphere.

Signed at Chicago, Illinois this 27th day of July, A. D. 1916.

ALBERT T. WEAVER.
    ERNEST W. D. LAUFER.
    EBERHARD von WINTZINGERODE.

Witnesses:
    JAMES E. SIME,
    MADELEINE R. CAREL.